US011376793B2

(12) United States Patent
Kothari et al.

(10) Patent No.: US 11,376,793 B2
(45) Date of Patent: Jul. 5, 2022

(54) PRINTING PRODUCTION QUALITY PREDICTION

(71) Applicant: Hewlett-Packard Development Company, L.P., Spring, TX (US)

(72) Inventors: Sunil Kothari, Palo Alto, CA (US); Jun Zeng, Palo Alto, CA (US); Gary J. Dispoto, Palo Alto, CA (US); Viseth Sean, Orange, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/978,241

(22) PCT Filed: Apr. 26, 2018

(86) PCT No.: PCT/US2018/029580
§ 371 (c)(1),
(2) Date: Sep. 4, 2020

(87) PCT Pub. No.: WO2019/209301
PCT Pub. Date: Oct. 31, 2019

(65) Prior Publication Data
US 2021/0031454 A1 Feb. 4, 2021

(51) Int. Cl.
*B29C 64/386* (2017.01)
*B33Y 50/00* (2015.01)
*G06N 20/00* (2019.01)
*G06F 3/12* (2006.01)
*H04N 1/00* (2006.01)
*H04N 1/12* (2006.01)

(52) U.S. Cl.
CPC .......... *B29C 64/386* (2017.08); *B33Y 50/00* (2014.12); *G06F 3/1204* (2013.01);
(Continued)

(58) Field of Classification Search
CPC ..... B29C 64/386; B29C 64/182; B33Y 50/00; B33Y 10/00; G06N 20/00; G06N 3/0472;
(Continued)

(56) References Cited

U.S. PATENT DOCUMENTS 9,846,427 B2 12/2017 Straub et al.
2007/0176312 A1* 8/2007 Clark .................... B29C 64/153
264/40.1
(Continued)

FOREIGN PATENT DOCUMENTS

CN 104731535 A 6/2015
CN 105247426 A 1/2016
(Continued)

*Primary Examiner* — Darryl V Dottin
(74) *Attorney, Agent, or Firm* — Fabian VanCott

(57) ABSTRACT

A system and method for providing three dimensional printing production quality prediction is described herein. The system may include logic to scan a region of interest associated with a layer of a plurality of parts during printing to obtain an input for the region of interest and compute an input metric associated with the layer based on the input. In response to an initial set of print jobs, at least a portion of the plurality of parts is mechanically tested to determine at least one output. In response to a production print job, a likelihood of a part of the plurality of parts to satisfy a quality specification is predicted by inputting the input metric to at least one machine learning function comprising the at least one output, wherein the at least one machine learning function is trained during the initial set of print jobs.

20 Claims, 9 Drawing Sheets

(52) U.S. Cl.
CPC .......... *G06F 3/1208* (2013.01); *G06F 3/1256* (2013.01); *G06F 3/1259* (2013.01); *G06N 20/00* (2019.01); *H04N 1/00031* (2013.01); *H04N 1/00092* (2013.01); *H04N 1/12* (2013.01)

(58) Field of Classification Search
CPC ...... G06N 20/10; G06N 20/20; G06F 3/1204; G06F 3/1208; G06F 3/1256; G06F 3/1259; H04N 1/00031; H04N 1/00092; H04N 1/12; B22F 10/20; B22F 10/80; B22F 12/90; Y02P 10/25
USPC ....................................... 358/1.15
See application file for complete search history.

(56) References Cited

U.S. PATENT DOCUMENTS

| | | | |
|---|---|---|---|
| 2015/0024233 A1* | 1/2015 | Gunther | B22F 10/20 264/401 |
| 2015/0045928 A1 | 2/2015 | Perez et al. | |
| 2015/0057784 A1 | 2/2015 | Butler et al. | |
| 2015/0227654 A1 | 8/2015 | Hunsche et al. | |
| 2016/0236414 A1 | 8/2016 | Reese et al. | |
| 2016/0247092 A1* | 8/2016 | Watanabe | G06Q 10/101 |
| 2016/0306595 A1* | 10/2016 | Has | G06F 3/1217 |
| 2017/0090462 A1 | 3/2017 | Dave et al. | |
| 2017/0190194 A1* | 7/2017 | Zollner | B41J 2/2142 |
| 2018/0165867 A1* | 6/2018 | Kuhn | B33Y 50/00 |

FOREIGN PATENT DOCUMENTS

| | | |
|---|---|---|
| CN | 106182765 A | 12/2016 |
| CN | 106903315 A | 6/2017 |
| DE | 102016201289 A1 | 8/2017 |
| DE | 102016212573 A1 | 1/2018 |
| WO | WO-2014037806 A3 | 3/2014 |
| WO | 2015/026749 A1 | 2/2015 |
| WO | WO-2016201390 A1 | 12/2016 |
| WO | WO-2017087451 A1 | 5/2017 |
| WO | WO-2017196344 A1 | 11/2017 |
| WO | 2018/001454 A1 | 1/2018 |

* cited by examiner

400

700

PRINTING PRODUCTION QUALITY PREDICTION

BACKGROUND

Printing service providers often maintain numerous machines performing a variety of tasks involved in the printing production. These machines may include, for example, printers, cutting machines, sandblasters, hole drillers, tumblers, painters, and so forth. In some cases, to fulfill demand, the companies may maintain multiple identical machines, or several machines that perform the same or similar tasks. Multiple machines may allow the printing company to increase overall throughput, to handle different types of jobs, to account for throughput differences between different types of machines, and so forth.

DESCRIPTION OF THE DRAWINGS

Certain examples are described in the following detailed description and in reference to the drawings, in which.

DETAILED DESCRIPTION

Figure 1:
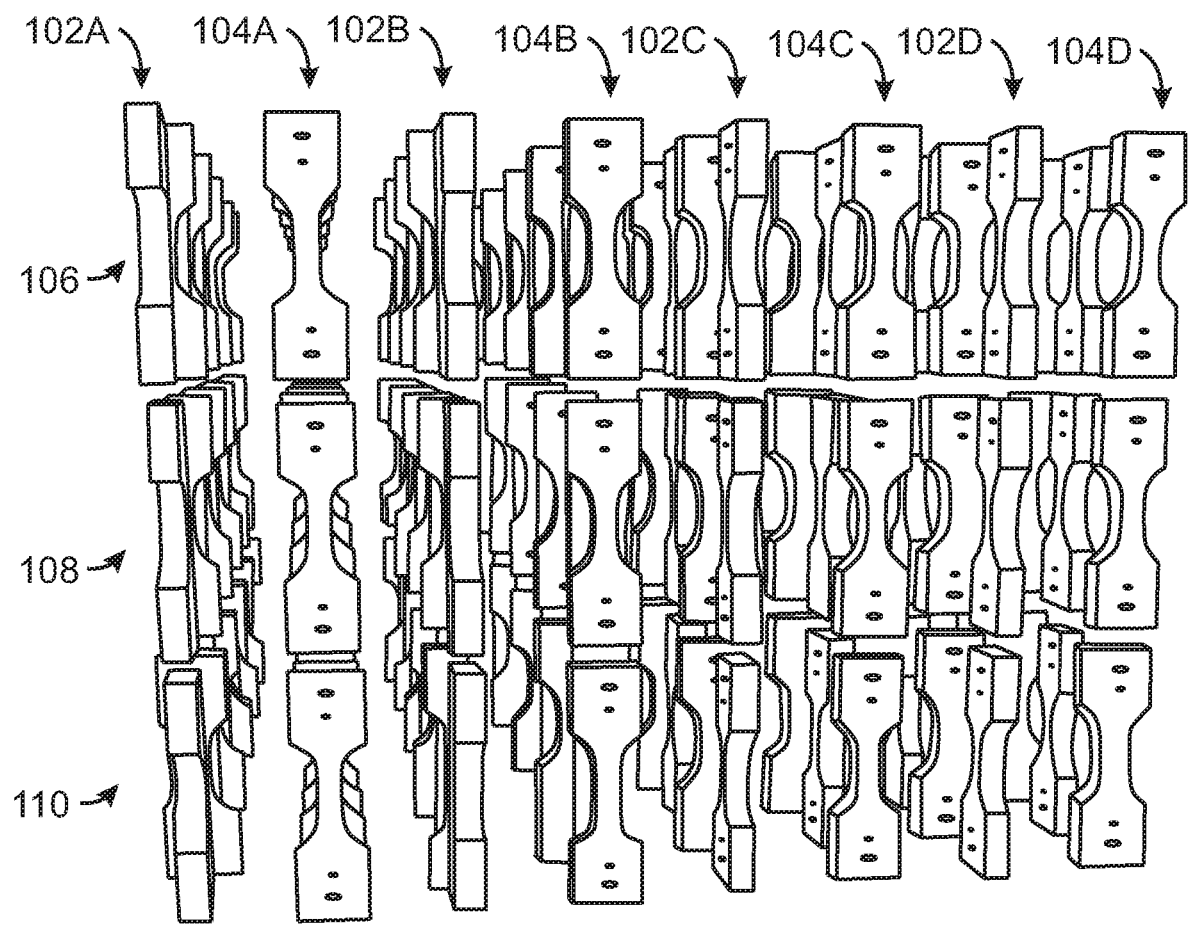
FIG. 1 is an illustration of a plurality of parts according to one example.

Techniques for printing production quality prediction are described herein. In examples, a print service provider may maintain a manufacturing facility including manufacturing equipment and facilities that are adapted for mass production. The equipment may include three dimensional (3D) printers. In examples, 3D printing is realized by building and modifying materials in a "layer-by-layer" fashion, as the final product may include an amalgamation of individual layers that have been "stitched" together at a molecular level via the introduction of thermal, radiative, and/or ionized beam energy. The thermal and radiative energy may be provided by a lamp assembly. The 3D printer may include an inkjet-type print head pen with a plurality of nozzles that selectively apply printing agents to the various layers of material. The lamp assembly enables fusion of the layers by melting the material. The present techniques are used to predict if the final part or product will meet a quality specification prior to completion of the final part or product. The prediction can be used to derive an accurate pre-print and post-print workflow that eliminates idle time for various equipment and facilities used in the pre-print and post-print workflow. This prediction can also be used to obtain the number of parts from a print job that will be reworked.

In the situation where the rework of parts that do not meet a quality specification is required, the rework can reduce an overall throughout and productivity of the manufacturing facility. For example, consider a case where two print jobs are scheduled in the manufacturing facility. Print job A will produce a plurality of parts A, and print job B will produce a plurality of parts B. Further consider that the plurality of parts A requires the application of a post-print workflow that includes sandblasting then painting, while the plurality of parts B requires the application of a post-print workflow that includes only sandblasting. In such a scenario, when the plurality of parts A is printed, the plurality of parts A can proceed to sandblasting then painting while the plurality of parts B is printed. In particular, equipment scheduling in the manufacturing facility may dictate that the plurality of parts A is painted while the plurality of parts B is sandblasted, leaving the printer available for other scheduled print jobs.

However, in the case where a number of parts from the plurality of parts A are to be reworked due to not meeting a quality specification, each of the sandblasting and painting equipment may sit idle until enough of the plurality of parts A are completed to begin the post-print workflow. Further, the rework of a portion of the plurality of parts A can cause delays for the plurality of parts B by creating a bottleneck at the sandblasting equipment, as both the plurality of parts A and the plurality of parts B require sandblasting. Additionally, the rework of a portion of the plurality of parts A can result in idle time at the painting equipment. As a result, the overall non-productive time of the manufacturing equipment can be substantially high. Accordingly, if a large number of printed products are to be manufactured using the same equipment, various factors, such as setup times, processing times, and process flows, for each product, may come into play and may hamper the overall productivity of the manufacturing equipment that can be exacerbated when rework of parts is required.

As described herein, print jobs may include pre-print workflows such as set-up of machines, heating of equipment and various materials. A pre-print workflow can be described as the manufacturing activities that occur prior to printing. Print jobs may also include printing and post-print workflows such as rasterizers, cutting machines, folders, binders, hole drillers, sandblasters, painters, tumblers, and the like. A post-print workflow can be described as the manufacturing activities that occur after printing. The print jobs may be scheduled based on different factors, such as materials needed, projected print time, equipment used, part specifications, part dimensions, or any combination thereof associated with the finished parts or products. The queuing of print jobs in a schedule may be complicated because of the various stages of production involved in the manufacturing of the product. Consequently, scheduling techniques are often ineffective in view of necessary rework that can change a schedule, create bottlenecks, and leave various equipment idle.

The techniques described herein are directed to providing printing production quality prediction. Three dimensional (3D) printers, such as those used in additive manufacturing, are used to print a plurality of parts in a layer-by-layer fashion. A print job may include thousands of layers, and in some cases can take an entire day to complete. After the pre-print workflow and printing, a post-print workflow is used to complete each part, and should only be applied to parts that satisfy a quality specification. The quality specification may be outlined in a service level agreement. In the event that a part fails to satisfy the quality specification, the failed parts should be reworked. Reworking failed parts can lead to various delays in manufacturing, and can cause several manufacturing components to be idle as the failed parts are reworked. To maintain efficient pre-printing, printing, and post-printing workflows, parts likely to fail may be predicted in order to efficiently account for the rework of the failed parts. As a plurality of parts are printed, a region of interest for each layer of the plurality of parts is scanned to obtain an input for each region of interest. An input metric associated with each layer is computed. Finally, a likelihood of each part to satisfy a quality specification is determined via a trained machine learning function.

FIG. 1 is an illustration of a plurality of parts 100. The plurality of parts 100 may be created during a 3D print job. In some cases, the plurality of parts 100 may be referred to as a batch. For exemplary purposes, in FIG. 1 the plurality of parts is illustrated as a plurality of dog bones. However, the present techniques should not be limited to dog bones, and can be used with any printed products. As illustrated, the print job created three rows 106, 108, and 110 of dog bones. The print job also created eight columns 102A, 104A, 1028, 1048, 102C, 104C, 102D, and 104D of dog bones. As illustrated, each dog bone is printed such that it is turned ninety degrees with respect to adjacent dog bones.

Many model shops and print service providers build the same batch of parts over and over again. For such batches, physical characteristics of the printed part can be predicted while the parts are in a build bucket during printing. The post-print workflow is then reserved for parts which have high likelihood of meeting quality standards. In this manner, an accurate number of satisfactory parts may be predicted, and this information can be used to schedule printing, as well as pre-print and post print workflows. Destructive testing of parts is not desirable due to the manual effort and the time needed to test each part. For example, it can take two hours for a 3D printer to warm up, eight hours to print a thousand layer job, then eight to twenty-four hours to cool the printed bucket and up to twenty-four hours to destructively test parts in the bucket. Even if each step of the workflow is automated, it is expensive to rework a batch if the parts do not meet the required quality specification, thereby increasing per unit cost of the part.

Consider the multiple layer build of dog bones as shown in FIG. 1. Each layer of dog bones is referred to as a row so as not to confuse each row with the layer by layer process of printing a part. In the example of FIG. 1, each dog bone is built vertically. Regions of interest in FIG. 1 may be defined as a cross section area of each part in the XY plane, where a desired application of the part will face stress along the neck (in Z direction). The part may be likely to fail in a region (spanning multiple layers) where the layer to layer bonding is not strong. Generally, a printed part can have one or more regions of interest. Further, a region of interest can be generally described as regions of the part where failure to meet a quality specification is likely. In some cases, a region of interest is defined as an area noted to fail in previous printing of the same parts. Additionally, in examples, an input may be defined that is used to predict the likelihood of part failure. The input may be a measurement, value, or combination of measurements and values that can be obtained during the printing process. For example, the input may be a temperature, layer thickness, temperature from previously laid blank layers, particular powder characteristics from a powder used during printing, firmware parameters such as lamp power pulse width modulation (PWM), roller temperature, cooling experienced by the part during and after printing, etc. The input may also be any combination of values that can be used to predict a likelihood of part failure.

Figure 2:
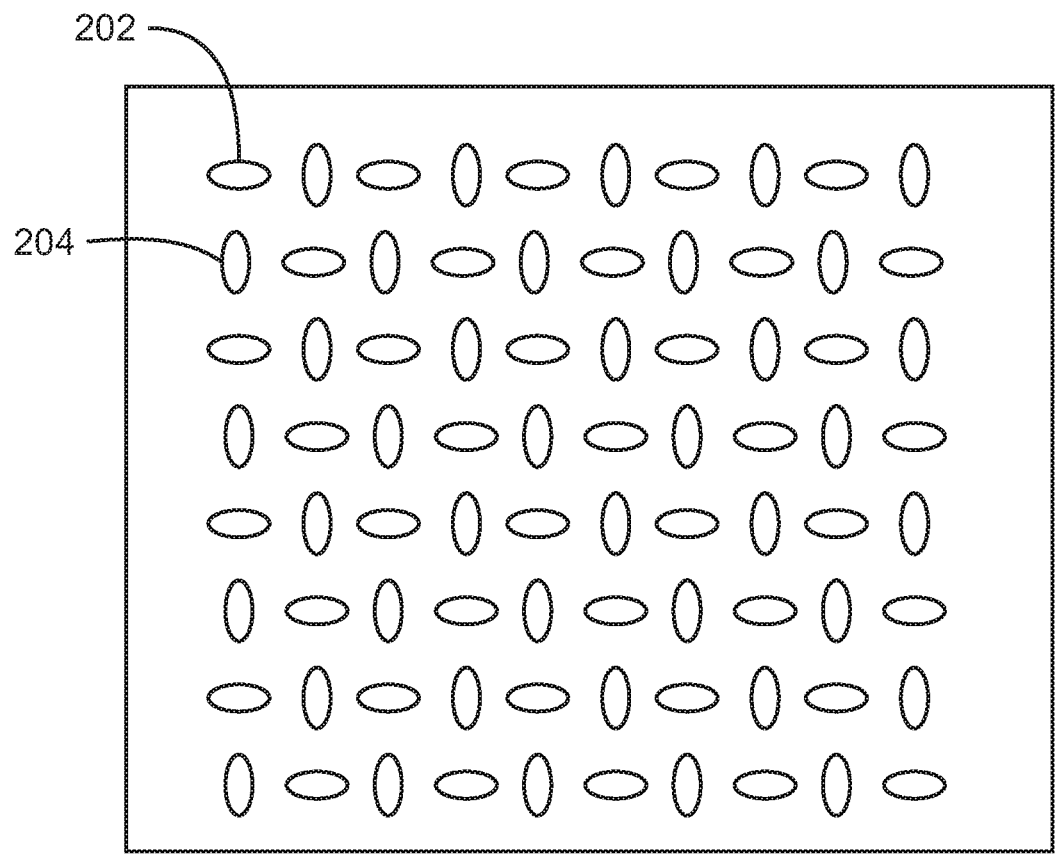
FIG. 2 is an illustration of an image of input capture according to one example.

FIG. 2 is an illustration of an image 200 of input capture. In FIG. 2, note that the image 200 includes a capture of a region of interest 202 for a first printed part and a region of interest 204 for a second printed part. The layout of the regions of interest in image 200 may correspond to the printed dog bones of FIG. 1.

In examples, a region of interest is scanned as each part is printed to obtain an input for each region of interest. Images, sensors, and other measurement techniques may be used to capture the input during a scan. For example, consider a print job with temperature as the input. Images from a high resolution thermal camera may be captured during the printing of the dog bones to obtain the image 200. In examples, the images may be 640*480 pixels in size. A low resolution thermal camera can also be used to capture the images, provided the regions of interest are up scaled accordingly. For example, a low resolution thermal camera may capture a larger number of pixels such that the number of pixels captured for each part can be used to derive the input value, which is a temperature value in this example. In some cases, a lower resolution thermal image can be up scaled to higher resolution thermal images. Images as well as sensors and other measurement techniques can also be used to capture inputs such as a color of the part, thickness of the layers as deposited, surface roughness, surface texture, dimensional accuracy, and other characteristics of the part that may be used to determine the quality of the finished part.

Selected regions of the parts may be designated regions of interest based on the input and its contribution to the desired output. These regions can be captured by an input capture mechanism. For example, in the case of the dog bones, selected regions of the dog bones are annotated for their contribution to mechanical strength. FIG. 2 illustrates dog bones with their associated regions of interest captured during printing. For each layer, an aggregate input metric can be calculated. In the example of the dog bones with temperature as an input, the input metric is a temperature metric that is associated with that layer. For example, the temperature metric may be a mean temperature of the pixels captured by each region of interest at a particular layer.

Consider a 3D printer with temperature as the input. Further consider a printer that follows a four pass per layer print mode. Accordingly, for each layer there are four pass temperatures as inputs, one for each pass. Additionally, for each pass, multiple frames may be captured so that in-process cooling can be determined and fed to the machine learning functions. The input temperature of the region of interest for each layer and, optionally, the associated firmware parameters then becomes a final input to a machine learning function such as a multilayer perceptron illustrated in FIG. 3. Further inputs may also include the orientation, layer (position in the build bucket resulting from stacking multiple parts in a build), or numbering for each part to the inputs.

Figure 3:
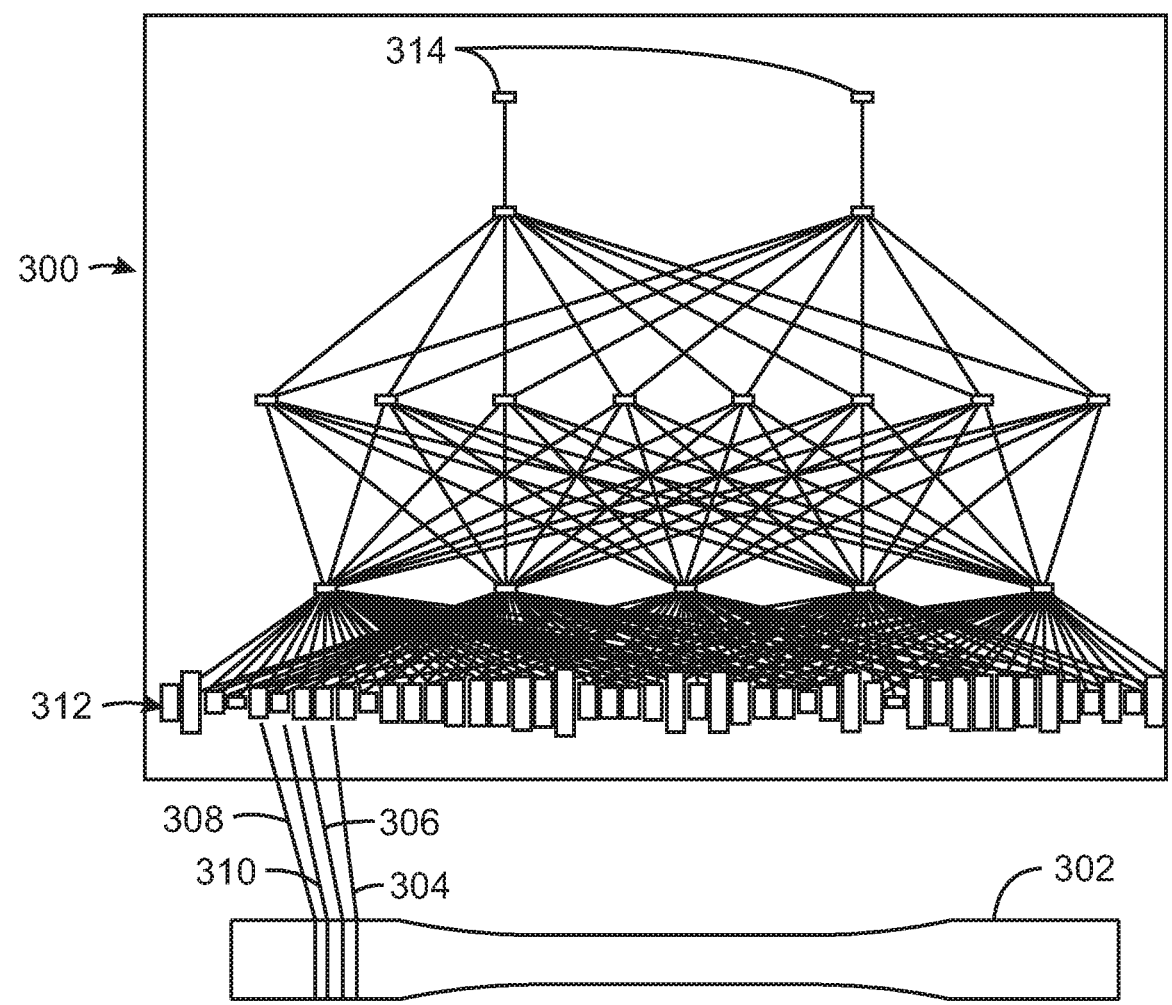
FIG. 3 is a multilayer perceptron with a dog bone according to one example.

FIG. 3 is a multilayer perceptron 300 with a dog bone 302. The dog bone has layers 304, 306, 308, and 310. Each of the layers 304, 306, 308, and 310 of the dog bone 302 are associated with inputs 312 of the multilayer perceptron 300. The multilayer perceptron is trained to derive outputs 314 based on the inputs 312. In an initial set of print jobs, some of the parts from the initial print jobs are mechanically tested to determine at least one true output of a machine learning function. For the initial few builds, at least a portion of parts are destructively tested to obtain outputs. In some cases, the outputs may be a ground truth associated with a training set of parts. The outputs are labels of the multilayer perceptron. When enough of these parts have been mechanically tested, the process of prediction of mechanical strength can the automated without breaking the parts.

Figure 4:
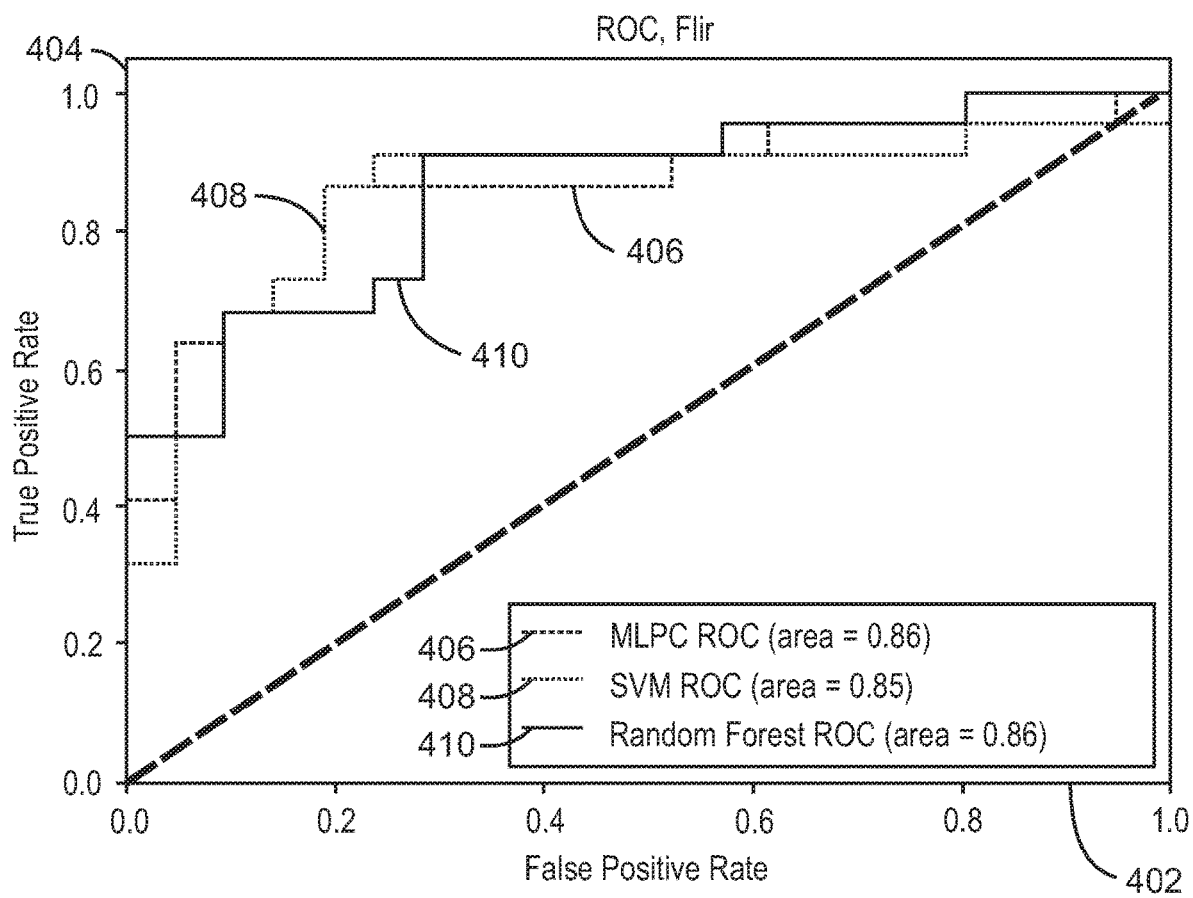
FIG. 4 is a graph illustrating receiver operating characteristic (ROC) curves 400 for multilayer perceptron (MLPC), random forest, and support vector machine (SVM) machine learning functions according to one example.

FIG. 4 is a graph illustrating receiver operating characteristic (ROC) curves 400 for multilayer perceptron (MLPC), random forest, and support vector machine (SVM) machine learning functions. In FIG. 4, the x-axis 402 represents a false positive rate, and the y-axis represents a true positive rate. Curve 406 corresponds to the multilayer perceptron function. Curve 408 corresponds to the SVM function. Curve 410 corresponds to the random forest function.

A number of machine learning functions are then tested on the input and output to learn the target function. FIG. 4 illustrates the receiver operating characteristic (ROC) curves for the multilayer perceptron, random forest and support vector machine functions. In the case where a function is a poor learner, such that the ROC scores are more than 0.5 but less than 0.7, the majority vote provides a buffer against a false positive result. While a plurality of machine learning functions are illustrated, a single machine learning function may be used. In the example of FIG. 4, each machine learning function may provide different information regarding the output based on the input. In the case where a number of inputs are available, deep learning neural networks may be used. The machine learning functions may also be adapted to various changes in the inputs by adjusting the learned weights or biases that have been established via the target function. For example, machine learning models can be adapted to a different powder used in printing by adjusting the learned weights or biases (in a MPLC) or changing decision points (decision tree/random forest) based on powder characteristics.

Figure 5A:
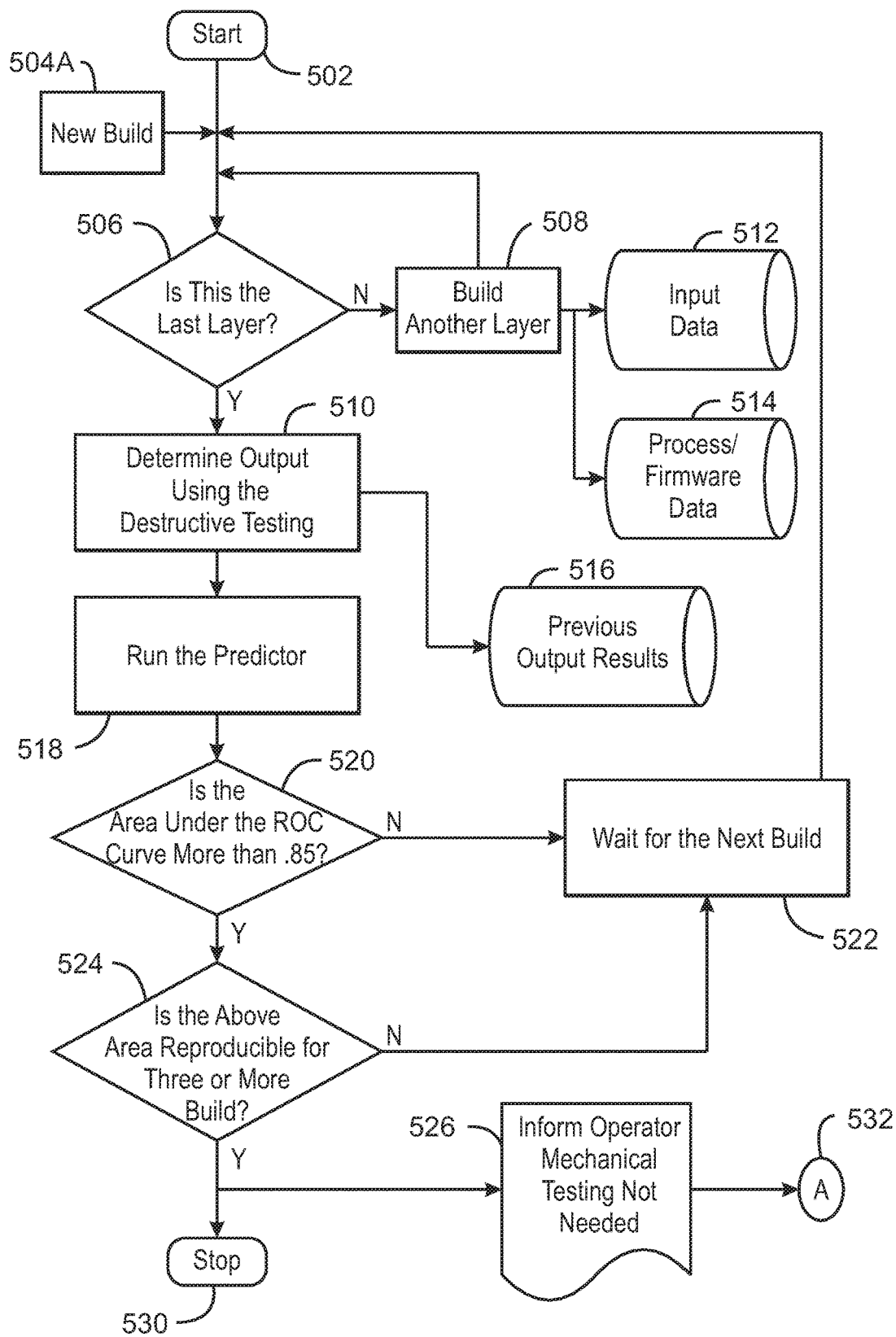
FIG. 5A is a process flow diagram illustrating a method to achieve a robust model that can accurately identify an output based on one or more inputs according to one example.

FIG. 5A is a process flow diagram illustrating a method 500A to achieve a robust model that can accurately identify an output based on one or more inputs. In an example, the method 500A may be used to identify the output mechanical strength from input process, thermal data. Process flow begins at the start 502. At block 504A, a new build is obtained. At block 506 it is determined if this is the last layer of the print job, process flow continues to block 510. If this is not the later layer of the print job, process flow continues to block 508. At block 508, another layer is built. Process flow the returns to block 506. Additionally, the input data associated with the current layer is stored. In the example of temperature as the input, thermal data is stored for each layer printed at block 512. Process/firmware data is also stored at block 514. Process/firmware data includes but is not limited to PWMs for warming and fusing lamps, speed of print, layer thickness, platen drop, fusing carriage, roller temperature, bed control temperature, preheat plate temperature, platen temperature, humidity percentage, airflow, etc. In general process/firmware data may be described as data specific to the particular printing technology used, such as Multi-Jet Fusion (MJF), Stereolithography (SLA), Digital Light Processing (DLP), Fused deposition modeling (FDM), Selective Laser Sintering (SLS), Selective laser melting (SLM), Electron Beam Melting (EBM), and Laminated object manufacturing (LOM).

At block 510, the output may be determined via destructive testing. In the example of temperature as an input and mechanical strength as an output, the mechanical strength of a portion of the plurality of parts may be determined via destructive testing. The output results may be stored at block 516. At block 518, a predictor is run. In examples, the predictor is at least one machine learning function used to obtain the output based on the input. Thus, the predictor is an instance or multiple instances of machine learning functions predicting a mechanical strength outcome. The functions are in training and are tested on a new build. When the current build has been evaluated, it may become a part of the training set. Note that a single build cannot be used for both training and testing builds at the same time.

At block 520, it is determined if the area under the ROC curve for each machine learning function is more than 85%. If the area under the ROC curve is more than 85% for a majority of machine learning functions, process flow continues to block 524. If the area under the ROC curve is not more than 85%, process flow continues to block 522. At block 522, machine learning on the current build stops, and the process flow waits for the next build.

At block 524, it is determined if the area under the ROC curve is reproducible for three or more builds. In this manner, the machine learning function is confirmed to be correct for at least three builds of the current part. If the area under the ROC curve is not reproducible for three or more builds, process flow continues to block 522 where process flow waits for the next build. If the area under the ROC curve is reproducible for three or more builds, process flow continues to block 526. At block 526, an operator is informed that further mechanical testing is not needed. At this point, mechanical testing has shown that the machine learning function converges on the correct solution. The machine learning function can be trusted, and process flow continues to block A at reference number 532.

Figure 5B:
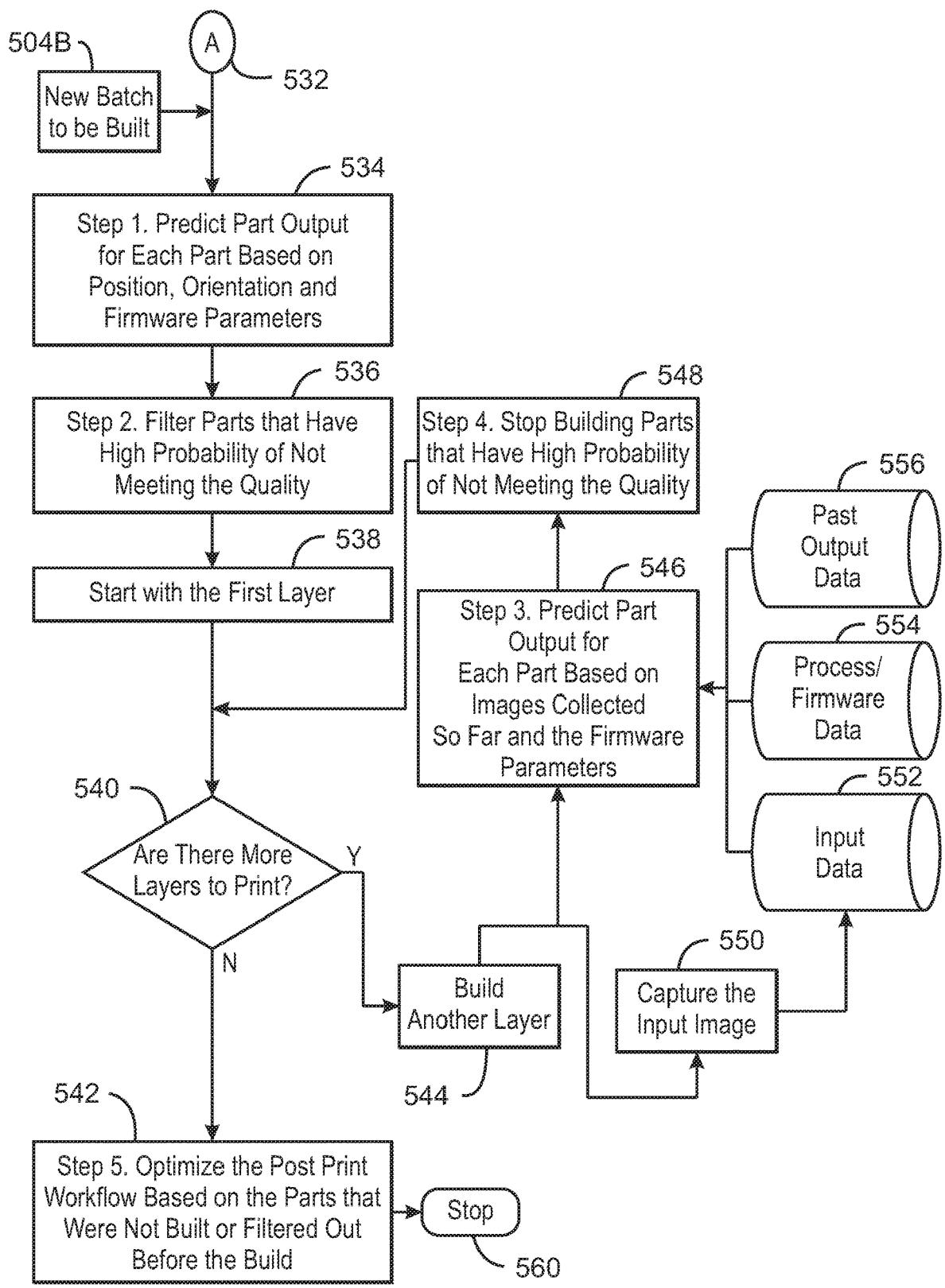
FIG. 5B is a process flow diagram illustrating a method for predicting printing production quality according to one example.

FIG. 5B is a process flow diagram illustrating a method 500B for predicting printing production quality. The method 500B begins at block A at reference number 532 with at least one trained machine learning function, such as the machine learning function derived by the method 500A. At block 504B, a new batch to be built in a production print job is initiated. At block 534, the probability of each part in the new batch or print job to meet a quality specification based on process parameters and part position is predicted. In examples, the threshold for prediction is a probability score of more than 91% for a majority of machine learning functions. At block 536, the parts predicted to fail at block 534 are removed and the remaining parts in the batch are rearranged until a fixed point is obtained. In some examples, the batch is not built at all. During a print job, the removal from a batch is the most extreme step for a part predicted to fail. In some cases, an identifier may be applied to the part to designate it as a failing part. An identifier may be any characteristic applied to a printed part that is different from the parts that are predicted to satisfy the quality specification. For example, the parts may be colored differently while in other cases they may be used as a sacrificial part to keep the thermal mass. In another case the part predicted to fail may be encased in a mesh for easy extraction (post-print). In yet another, case the part predicted to fail may have a different texture on the surface to easily identify failed parts.

At block 538, printing of the new batch begins with the first layer to be printed. For each layer during printing, the input is monitored for each part to determine a likelihood of the part not meeting the quality specification. Accordingly, at block 540 it is determined if there are more layers to print.

If there are more layers to print, process flow continues to block 544. If there are no more layers to print, process flow continues to block 542.

At block 544, the next layer is built. For each layer, at block 546, the probability that the input meets the quality specification is predicted based on the input images collected for each layer. In the example of temperature as an input and mechanical strength as an output, the mechanical strength for each part may be predicted based on thermal images collected and firmware parameters. Accordingly, at block 550, during printing, for each layer, the input image is obtained. In the example of temperature as an input and mechanical strength as an output, at block 550 a thermal image is captured for each layer during printing. In examples, the predicted mechanical strength based on the thermal data and the process parameters is discounted by the number of layers not yet printed. In this manner, as more layers are printed, there is more confidence in the probability scores.

For each layer during printing, input data at block 552, process/firmware data at block 554, and past output data at block 556 may be stored. This information can be used at block 546 to predict the likelihood that each part will meet the applicable quality specification. At block 548, parts which are identified as likely to fail to meet the quality specifications are not built anymore. At block 542, once the batch has finished printing, a post-print workflow can optimized to take into account the parts which need to be built again or require special handling (automated filtering by a robotic arm). The schedule can be further optimized to meet the SLAs associated at the factory level.

Figure 6:
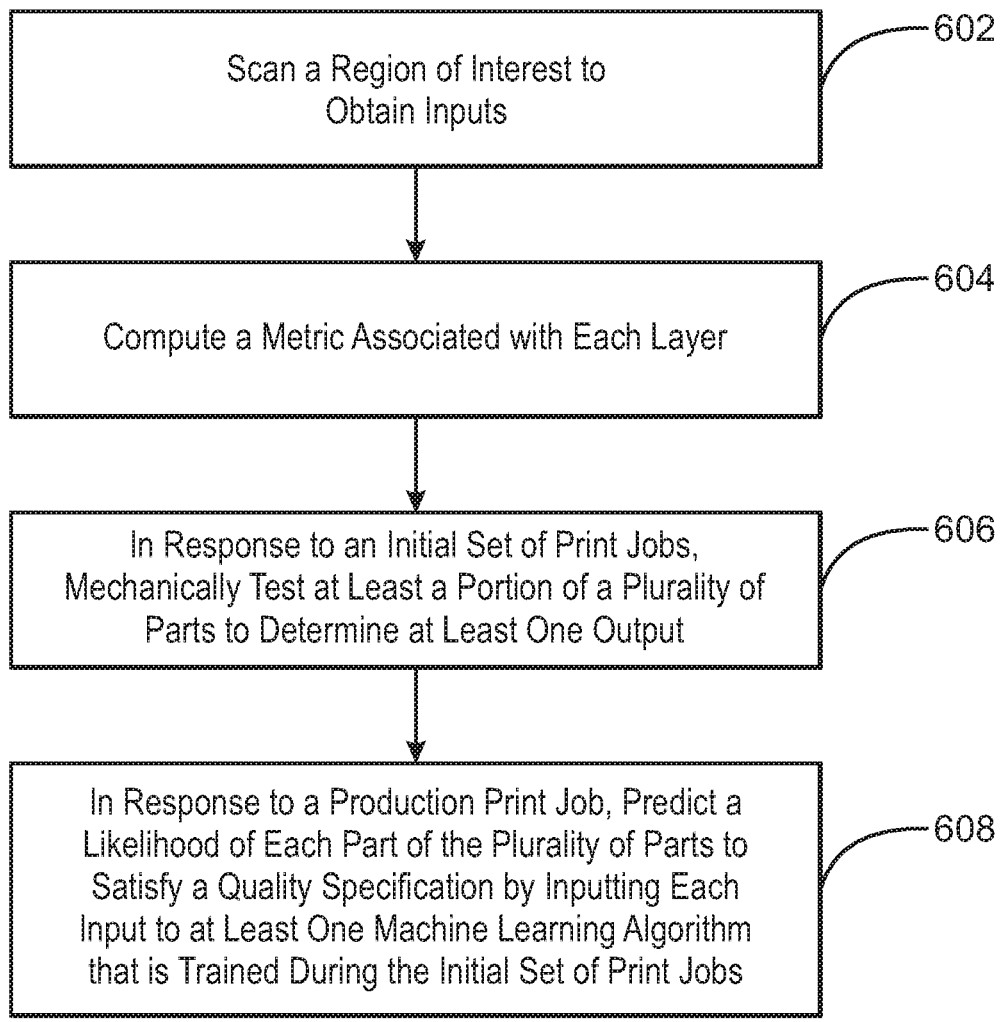
FIG. 6 is a process flow diagram of a method that enables three dimensional printing production quality prediction according to one example.

FIG. 6 is a process flow diagram of a method 600 that enables three dimensional printing production quality prediction. At block 602, a region of interest is scanned to obtain input parameters. At block 604, a metric associated with each layer is computed. At block 606, in response to an initial set of print jobs, at least a portion of a plurality of parts is mechanically tested to determine at least one output. At block 608, in response to a production print job, a likelihood of each part of the plurality of parts to satisfy a quality specification is predicted by inputting each input to at least one machine learning function that is trained during the initial set of print jobs.

Figure 7:
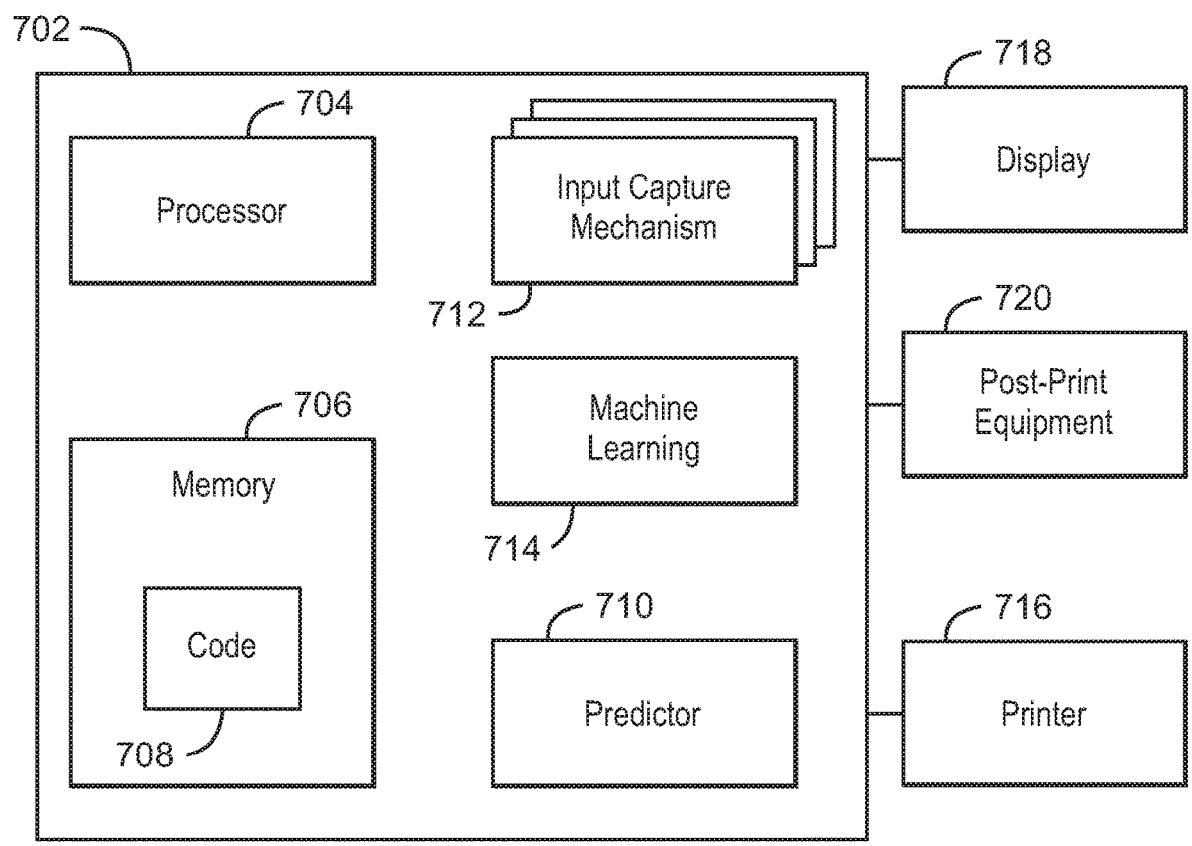
FIG. 7 is a block diagram of a system to predict print production quality according to one example.

FIG. 7 is a block diagram of a system 700 to predict print production quality. The system 700 processor may include a computing device 702, a processor 704, a memory 706 with code 708, and a predictor 710. The predictor 710 may include one or more trained machine learning functions obtained from the machine learning block 714, where the functions are trained using inputs obtained from the input capture mechanism 712. The input capture mechanism may be able to obtain thermal data, dimension such as thickness, width, and depth of each layer. The input capture mechanism may also be used to obtain other inputs such as color, surface roughness, and the like.

The computing device 702 may include memory 706 that stores instructions executable by a processor 704. The processor 704 may be more than one processor, and each processor may have more than one core. The processor 704 may be a single core processor, a multi-core processor, a computing cluster, or other configurations. The processor 704 may be a central processing unit (CPU), a microprocessor, a processor emulated on programmable hardware (e.g. FPGA), or other type of hardware processor. The processor 704 may be implemented as a Complex Instruction Set Computer (CISC) processor, a Reduced Instruction Set Computer (RISC) processor, an x86 Instruction set compatible processor, or other microprocessor or processor.

The memory 706 may be non-volatile memory and/or volatile memory. The non-volatile memory may include hard drive(s), solid state drive(s), read-only memory (ROM) (e.g., Mask ROM, PROM, EPROM, EEPROM, etc.), flash memory, and so forth. The volatile memory may include cache, random access memory (RAM) (e.g., SRAM, DRAM, zero capacitor RAM, SONOS, eDRAM, EDO RAM, DDR RAM, RRAM, PRAM, etc.), and other volatile memory. Other memory systems may be employed. The memory 706 can be used to store data and code 708, such as instructions, logic, etc. that, when executed by the processor 704, direct the processor 704 to perform various operations in accordance with examples described herein.

Computing device 702 may also include predictor 710. The predictor 710 may be used to predict the likelihood of each part to meet a quality specification as described above. The computing device 702 may transmit the prediction and any other data to a display 718, post print equipment 720, and a printer 716. Each of the display 718, post print equipment 720, and printer 716 can use the prediction to further refine their respective processes.

The block diagram of FIG. 7 is not intended to indicate that the system 700 is to include all of the components shown in FIG. 7. Rather, the system 700 can include fewer or additional components not shown in FIG. 7, depending on the details of the specific implementation. The system 700 may include both local and remote implementations. Furthermore, any of the functionalities of the processor 704 may be partially, or entirely, implemented in hardware and/or a processor. For example, the functionality may be implemented in any combination of Application Specific Integrated Circuits (ASICs), Field Programmable Gate Arrays (FPGAs), logic circuits, and the like. In addition, examples of the present techniques can generally be implemented in electronic devices, including ultra-compact form factor devices, such as System-On-a-Chip (SOC), multi-chip modules, and other electronic devices.

Figure 8:
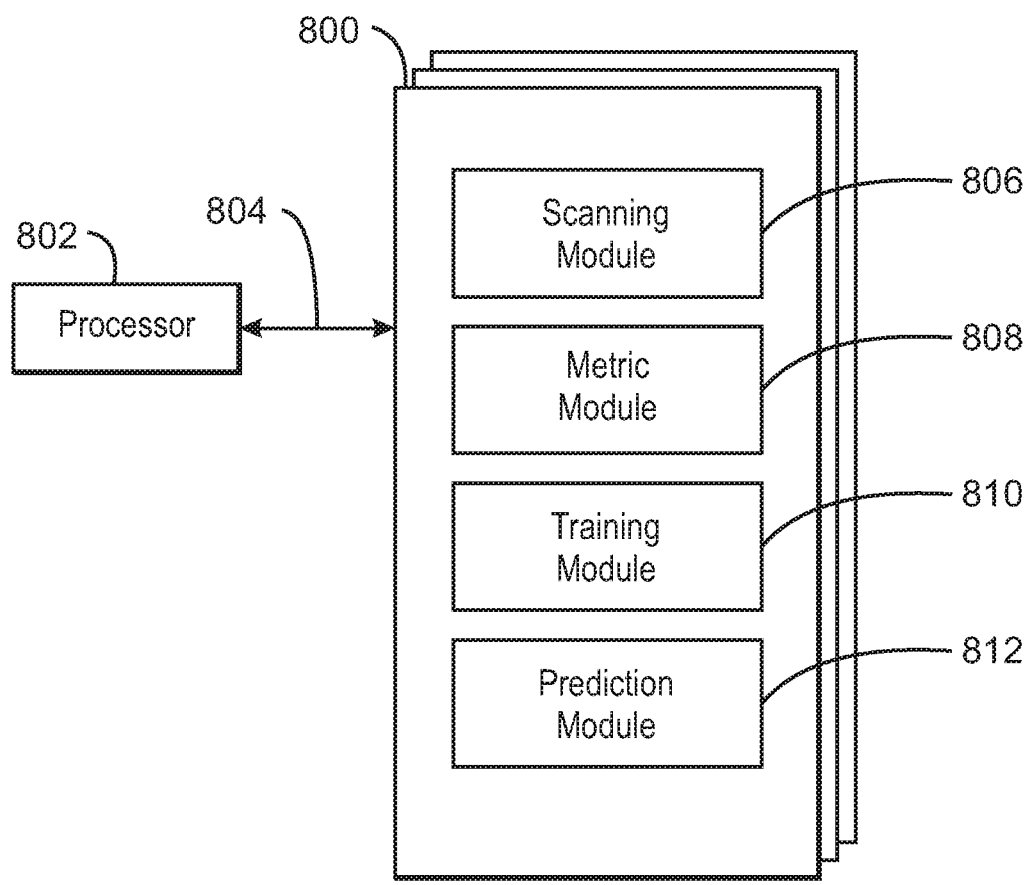
FIG. 8 is a block diagram of a medium containing code to execute three-dimensional printing production quality prediction in accordance with examples of the present techniques.

FIG. 8 is a block diagram of a medium 800 containing code to execute three dimensional printing production quality prediction. The medium 800 may be a non-transitory computer-readable medium that stores code that can be accessed by a processor 802 via a bus 804. For example, the computer-readable medium 800 can be a volatile or non-volatile data storage device. The medium 800 can also be a logic unit, such as an ASIC, an FPGA, or an arrangement of logic gates implemented in one or more integrated circuits, for example.

The medium 800 may include modules 806-812 configured to perform the techniques described herein. For example, a scanning module 806 may be configured to scan a region of interest to obtain input parameters. A metric module 808 may be configured to compute a metric associated with each layer. A training module 810 may be configured to obtain data from mechanically testing at least a portion of a plurality of parts to determine at least one output in response to an initial set of print jobs. The at least one output may be used to train at least one machine learning function. A prediction module 812 may be configured to predict a likelihood of each part of the plurality of parts to satisfy a quality specification by inputting each input to at least one machine learning function that is trained during the initial set of print jobs in response to a production print job.

The block diagram of FIG. 8 is not intended to indicate that the medium 800 is to include all of the components shown in FIG. 8. Further, the medium 800 may include any number of additional components not shown in FIG. 8, depending on the details of the specific implementation.

The present techniques enable pre-print rework prediction, where the prediction occurs before the build has even started. If the likelihood of a part to meet a quality specification is very low, the part is removed from the build, effectively becoming a tool to influence a finer-grained keep-out zone. Additionally, in-build rework prediction includes providing a statistical assessment for the part to not meet quality. If the probability is low, the build of the part is stopped. This feature can influence the need for downstream testing of this part, and type of tools (e.g., CMM or scanning) thus optimize post-print workload. Finally, the present techniques enable production throughput optimization. In particular, the re-work flow over the entire factory floor is assessed, statistically, including the type of parts, overall volume needs to be preserved for re-work, urgency (SLA) associated with these volumes. This will guide optimization of production throughput.

In summary, an example may include a system for providing three dimensional printing production quality prediction. The system may include logic to scan a region of interest associated with a layer of a plurality of parts during printing to obtain an input for the region of interest and compute an input metric associated with the layer based on the input. In response to an initial set of print jobs, at least a portion of the plurality of parts is mechanically tested to determine at least one output. In response to a production print job, a likelihood of a part of the plurality of parts to satisfy a quality specification is predicted by inputting the input metric to at least one machine learning function comprising the at least one output, wherein the at least one machine learning function is trained during the initial set of print jobs.

The input may be a temperature of the current layer, a layer thickness, a temperature from a previously laid blank layer, a given powder, a firmware parameter, or any combination thereof. The quality specification may be a desired value of the at least one output. The input metric may be a temperature metric that is an average temperature of a plurality of pixels within the region of interest during a pass of printing. At least one output may be a probability of the part to satisfy the quality specification that specifies at least one of process, thermal, location, or orientation data associated with the part. In response to a production print job, a confidence in the likelihood may increase as the number of printed layers increases. In response to the likelihood indicating a failure of a part to satisfy the quality specification, the printing of the part is designated as a failing part by applying an identifier to the part, or printing of the part is halted. In response to the likelihood indicating a failure of the part to satisfy the quality specification, the part may be removed from parts that satisfy the quality specification. The likelihood of the part of the plurality of parts to satisfy a quality specification may be used to schedule a pre-print workflow and a post-print workflow. A thermal camera may scan the region of interest for a layer of the plurality of parts and output a temperature for the region of interest. The input metric may be input to a plurality of machine learning functions that are trained based on the at least one output, and a predicted likelihood from the plurality of machine learning functions is used to determine if the part satisfies the quality specification.

Another example is a method for providing three dimensional printing production quality prediction. The method may include obtaining a first input associated with a first part of a first plurality of parts during a first print job and deriving a first input metric based on the first input. The method further includes mechanically testing at least a portion of the first plurality of parts to determine a ground truth associated with the first input metric. Additionally, the method includes predicting a likelihood of a second part of a second plurality of parts to satisfy a quality specification by inputting a second input metric to at least one machine learning function trained using the ground truth and first input metric during a second print job.

A third print job may be scheduled based on a throughput calculated from the likelihood of the second part of the second plurality of parts to satisfy the quality specification. A post-print workflow may be derived based on a throughput calculated from the likelihood of the second part of the second plurality of parts to satisfy the quality specification. At least one machine learning function may be adapted to a change in a second input by adjusting the learned weights, biases, or decision points of the machine learning function. The ground truth may be a probability of a part to satisfy a quality specification that specifies at least one of process, thermal, location, or orientation data.

While the present techniques may be susceptible to various modifications and alternative forms, the examples discussed above have been shown only by way of example. It is to be understood that the technique is not intended to be limited to the particular examples disclosed herein. Indeed, the present techniques include all alternatives, modifications, and equivalents falling within the scope of the present techniques.

What is claimed is:

1. A system for providing three: dimensional (3D) printing production quality prediction, comprising:
   logic to:
   scan a region of interest associated with a layer of a plurality of parts during printing to obtain an input for the region of interest;
   compute an input metric associated with the layer based on the input;
   from an initial set of 3D print jobs, receiving results from mechanically testing at least a portion of parts produced in the initial set of 3D print jobs to determine at least one output;
   train a machine learning function using the input metric and results from mechanically testing parts from all of the initial set of print jobs;
   in response to a production print job, predict a likelihood of a part of a plurality of parts of the production print job to satisfy a quality specification using the trained machine learning function, wherein the at least one machine learning function is trained during the initial set of print jobs; and
   make adjustments to the production print job based on the predicted likelihood of a part of the production print job satisfying the quality specification.

2. The system of claim 1, wherein the input is a temperature of the current layer, a layer thickness, a temperature from a previously laid blank layer, a given powder, a firmware parameter, or any combination thereof.

3. The system of claim 1, wherein the quality specification is a desired value of the at least one output.

4. The system of claim 1, wherein the input metric is a temperature metric that is an average temperature of a plurality of pixels within the region of interest during a pass of printing.

5. The system of claim 1, wherein the at least one output is a probability of the part to satisfy the quality specification that specifies at least one of process, thermal, location, or orientation data associated with the part.

6. The system of claim 1, wherein in response to a production print job, a confidence in the likelihood increases as the number of printed layers increases.

7. The system of claim 1, wherein in response to the likelihood indicating a failure of a part to satisfy the quality specification, the printing of the part is designated as a failing part by applying an identifier to the part, or printing of the part is halted.

8. The system of claim 1, wherein in response to the likelihood indicating a failure of the part to satisfy the quality specification, the part is removed from parts that satisfy the quality specification.

9. The system of claim 1, wherein the likelihood of the part to satisfy a quality specification is used to schedule a pre-print workflow and a post-print workflow.

10. The system of claim 1, wherein the input metric is input to a plurality of machine learning functions that are trained based on the at least one output, and a predicted likelihood from the plurality of machine learning functions is used to determine if the part satisfies the quality specification.

11. A method for providing three: dimensional (3D) printing production quality prediction, comprising:
    obtaining a first input associated with a first part of a first plurality of parts during a first 3D print job;
    deriving a first input metric based on the first input;
    mechanically testing at least a portion of the first plurality of parts to determine a ground truth associated with the first input metric; and
    training a machine learning function using the input metric and the ground truth resulting from mechanically testing of the portion of the first plurality of parts so that the machine learning function is trained for predicting a likelihood of a second part of a second plurality of 3D parts to satisfy a quality specification by inputting a second input metric to the trained machine learning function during a second print job.

12. The method of claim 10, wherein a third print job is scheduled based on a throughput calculated from the likelihood of the second part of the second plurality of parts to satisfy the quality specification.

13. The method of claim 10, wherein a post-print workflow is derived based on a throughput calculated from the likelihood of the second part of the second plurality of parts to satisfy the quality specification.

14. The method of claim 10, wherein the at least one machine learning function is adapted to a change in a second input by adjusting the learned weights, biases, or decision points of the machine learning function.

15. The method of claim 10, wherein the ground truth is a probability of a part to satisfy a quality specification that specifies at least one of process, thermal, location, or orientation data.

16. A method for providing three dimensional printing production quality, comprising:
    scanning a region of interest associated with a layer of a plurality of parts during printing of a current print job to obtain an input for the region of interest;
    providing the input for the region of interest to a trained machine learning function that has been trained using scanned input from a corresponding region of interest taken during a number of previous print jobs and results of mechanically testing parts containing that corresponding region of interest from the number of previous print jobs;
    with the trained machine learning function, predicting a likelihood that a part in the current print job containing the region of interest will satisfy a quality specification; and
    making adjustments to the current print job based on the predicted likelihood of the part in the current print job containing the region of interest to satisfy the quality specification.

17. The method of claim 16, wherein making adjustments comprises, in response to a prediction that the part in the current print job is unlikely to satisfy the quality specification, adding a different texture or color to the part.

18. The method of claim 16, wherein making adjustments comprises, in response to a prediction that the part in the current print job is unlikely to satisfy the quality specification, applying an identifier to the part.

19. The method of claim 16, wherein making adjustments comprises, in response to a prediction that the part in the current print job is unlikely to satisfy the quality specification, terminating further production of the part.

20. The method of claim 16, wherein the machine learning function comprises a plurality of different machine learning algorithms, the method further comprising predicting the likelihood based on consideration of predictions output by all of the different machine learning algorithms.

* * * * *